(12) United States Patent
Okoroafor et al.

(10) Patent No.: US 10,401,808 B2
(45) Date of Patent: Sep. 3, 2019

(54) METHODS AND COMPUTING SYSTEMS FOR PROCESSING AND TRANSFORMING COLLECTED DATA TO IMPROVE DRILLING PRODUCTIVITY

(71) Applicant: Schlumberger Technology Corporation, Houston, TX (US)

(72) Inventors: Rita Esuru Okoroafor, Lagos (NG); Wentao Zhou, Abingdon (GB); Shahid Azizul Haq, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 462 days.

(21) Appl. No.: 14/986,543

(22) Filed: Dec. 31, 2015

(65) Prior Publication Data

US 2016/0215606 A1  Jul. 28, 2016

Related U.S. Application Data

(60) Provisional application No. 62/108,743, filed on Jan. 28, 2015.

(51) Int. Cl.
| | |
|---|---|
| *G05B 15/02* | (2006.01) |
| *E21B 49/00* | (2006.01) |
| *E21B 44/00* | (2006.01) |

(52) U.S. Cl.
CPC .............. *G05B 15/02* (2013.01); *E21B 44/00* (2013.01); *E21B 49/003* (2013.01)

(58) Field of Classification Search
CPC ........ G05B 15/02; E21B 44/00; E21B 49/003
See application file for complete search history.

(56) References Cited

U.S. PATENT DOCUMENTS

| | | | |
|---|---|---|---|
| 6,785,641 B1 * | 8/2004 | Huang | E21B 10/00 |
| | | | 175/45 |
| 7,725,302 B2 | 5/2010 | Ayan et al. | |

(Continued)

FOREIGN PATENT DOCUMENTS

| | | |
|---|---|---|
| WO | 0162603 A2 | 8/2001 |
| WO | 2009129060 A1 | 10/2009 |

(Continued)

OTHER PUBLICATIONS

J.C. Helton, J.D. Johnson, C.J. Sallaberry, C.B. Storlie, Survey of sampling-based methods for uncertainty and sensitivity analysis, Reliability Engineering & System Safety, vol. 91, Issues 10-11, 2006, pp. 1175-1209.*

(Continued)

*Primary Examiner* — Christopher E. Everett
(74) *Attorney, Agent, or Firm* — Alec J. McGinn (57) ABSTRACT

Fluid data collected while drilling a wellbore in a drilling operation that includes a first well trajectory is received. A first productivity metric for a next section of the wellbore on a continued trajectory of the first well section trajectory is determined, based at least in part on the fluid data. A second well section trajectory for the next section of the wellbore different from the continued trajectory of the first well section trajectory is determined. A second productivity metric for the second well trajectory is determined. The drilling operation is adjusted if the first productivity index differs from the second productivity index by more than a threshold amount.

18 Claims, 7 Drawing Sheets

(56) References Cited

U.S. PATENT DOCUMENTS

| | | | |
|---|---|---|---|
| 7,966,166 B2 | 6/2011 | Thambynayagam et al. | |
| 8,839,858 B2 | 9/2014 | Mullins et al. | |
| 2005/0119911 A1 | 6/2005 | Ayan et al. | |
| 2007/0032994 A1* | 2/2007 | Kimminau | E21B 43/12 703/10 |
| 2007/0203681 A1* | 8/2007 | Eyvazzadeh | E21B 47/00 703/10 |
| 2007/0289740 A1* | 12/2007 | Thigpen | E21B 37/06 166/250.01 |
| 2009/0095469 A1* | 4/2009 | Dozier | E21B 43/26 166/250.01 |
| 2010/0088078 A1* | 4/2010 | Geehan | E21B 43/26 703/2 |
| 2010/0185395 A1 | 7/2010 | Pirovolou et al. | |
| 2010/0282508 A1* | 11/2010 | Johnston | E21B 7/04 175/24 |
| 2011/0040533 A1* | 2/2011 | Torrens | E21B 44/00 703/2 |
| 2011/0071810 A1* | 3/2011 | Yeriazarian | E21B 43/12 703/10 |
| 2011/0264429 A1* | 10/2011 | Lee | E21B 47/022 703/10 |
| 2012/0024605 A1* | 2/2012 | Elinas | G06Q 10/06 175/57 |
| 2013/0346359 A1* | 12/2013 | Lu | G06F 17/30595 707/600 |
| 2016/0201395 A1* | 7/2016 | Gosling | E21B 43/00 175/40 |

FOREIGN PATENT DOCUMENTS

| | | |
|---|---|---|
| WO | 2009/142873 A1 | 11/2009 |
| WO | 2010053618 A1 | 5/2010 |

OTHER PUBLICATIONS

Rita Esuru Okoroafor, et al.; SPE-178416-MS While-Drilling Productivity Evaluation of Horizontal Walls; Nigerian Annual International Conference and Exhibition, Lagos, Nigeria, Aug. 4-6, 2015; pp. 1-19, Society of Professional Engineers, USA.

Rita Esuru Okoroafor, et al.; IPTC 17489 Maximizing the Benefits of Real-Time LWD Data for Production Performance Prediction; International Petroleum Technology Conference,Doha, Qatar, Jan. 20-22, 2014; pp. 1-8, International Petroleum Technology Conference, USA.

Rita Esuru Okoroafor, et al.; SPE-175671-MS Maximizing Recovery by Integrating an Advanced Reservoir Simulation Approach Into the Drilling Process of Horizontal Walls; SPE Reservoir Characterisation and Simulation Conference and Exhibition, Abu Dhabi, UAE, Sep. 14-16, 2015; pp. 1-11; Society of Professional Engineers; USA.

Wikipedia, the free encyclopedia; printed Mar. 9, 2016; "Darcy's Law in Petroleum Engineering;" http://en.wikipedia.org/wiki/Darcy's_law#Darcy.27s_Law_in_Petroleum_Engineering.

Wikipedia, the free encyclopedia; printed Mar. 9, 2016; Sensitivity Analysis; http://en.wikipedia.org/wiki/Sensitivity_analysis.

Wikipedia, the free encyclopedia; printed Mar. 9, 2016; 'Uncertainty Analysis;' http://en.wikipedia.org/wiki/Uncertainty_analysis.

Zhang et al., "Method and Utility of Well Productivity Estimation While Drilling," SPE Paper 130811 presented at the CSP/SPE International Oil and Gas Conference and Exhibition held in Beijing, China, Jun. 8-10, 2010.

International Search Report and Written Opinion for the equivalent International patent application PCT/US2016/015250 dated May 23, 2016.

International Preliminary Report on Patentability for the equivalent International patent application PCT/US2016/015250 dated Aug. 10, 2017.

A partial supplementary European search report issued by the European Patent Office dated Aug. 16, 2018 in connection with European patent application No. 16744068.4.

Supplementary Search and Examination Report R62 EPC issued in European Patent application 16744068.4 dated Nov. 26, 2018, 11 pages.

ECLIPSE Reservoir Simulation Software, Technical Description, Chapter 37 "Initializing the Study." Schlumberger Technology Corporation, 2008, 14 pages.

\* cited by examiner

METHODS AND COMPUTING SYSTEMS FOR PROCESSING AND TRANSFORMING COLLECTED DATA TO IMPROVE DRILLING PRODUCTIVITY

CROSS REFERENCE TO RELATED APPLICATIONS

This application claims priority to U.S. Provisional App. No. 62/108,743, filed Jan. 28, 2015, which is incorporated by reference in its entirety.

BACKGROUND

Successful drilling of wells, particularly horizontal wells, is extremely difficult. The direction and total depth of a well can significantly impact its productivity. A well may be thousands of feet deep and differences of only meters may impact the productivity of the well by significant amounts—e.g., tens of percent. Such errors can be the difference between a successful well and a well with production insufficient for the cost of drilling the well. Accordingly, improved productivity estimates for determining well trajectory are needed.

BRIEF SUMMARY

In an exemplary embodiment of a method according to the present disclosure, fluid data collected while drilling a wellbore in a drilling operation that includes a first well section trajectory is received. A first productivity metric for a next section of the wellbore on a continued trajectory of the first well section trajectory is determined, based at least in part on the fluid data. A second well section trajectory for the next section of the wellbore different from the continued trajectory of the first well section trajectory is determined. A second productivity metric for the second well trajectory is determined. The drilling operation is adjusted if the first productivity index differs from the second productivity index by more than a threshold amount.

In another exemplary embodiment, a method includes: determining a base productivity estimate using a productivity forecast while drilling the wellbore; identifying at least one parameter of the productivity forecast; performing sensitivity analysis for the identified at least one parameter; determining whether additional data for the at least one parameter would reduce uncertainty; and obtaining, if the determining indicates that additional data will reduce uncertainty, additional data for the at least one parameter while drilling the wellbore.

In another exemplary embodiment, a surface unit for processing oilfield data includes a receiver and a processor. The receiver is configured to receive logging while drilling (LWD) data collected in real time from a LWD tool used in the drilling operation at a first well trajectory. The LWD data includes fluid data. The processor is configured to determine, based at least in part on the fluid data, a first productivity metric of a wellbore for a current depth of the wellbore, extend the first well trajectory to determine a second well trajectory, determine a second productivity metric for the second well trajectory, and determine an adjustment for the drilling operation of the wellbore if the first productivity index differs from the second productivity index by more than a threshold amount

BRIEF DESCRIPTION OF THE DRAWINGS

For a better understanding of the aforementioned embodiments as well as additional embodiments thereof, reference should be made to the Detailed Description below, in conjunction with the following drawings in which like reference numerals refer to corresponding parts throughout the figures.

DETAILED DESCRIPTION

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits and networks have not been described in detail so as not to unnecessarily obscure aspects of the embodiments.

It will also be understood that, although the terms first, second, etc., may be used herein to describe various elements, these elements should not be limited by these terms. These terms are used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered the same object or step.

The terminology used in the description of the invention herein is for the purpose of describing particular embodiments and is not intended to be limiting of the invention. As used in the description of the invention and the appended claims, the singular forms "a," "an" and "the" are intended to include the plural forms as well, unless the context clearly indicates otherwise. It will also be understood that the term "and/or" as used herein refers to and encompasses any possible combination of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof As used herein, the term "if" may be construed to mean "when" or "upon" or "in response to determining" or "in response to detecting," depending on the context.

Those with skill in the art will appreciate that while some terms in this disclosure may refer to absolutes, e.g., all of the components of a wavefield, all source receiver traces, each of a plurality of objects, etc., the methods and techniques disclosed herein may also be performed on fewer than all of a given thing, e.g., performed on one or more components and/or performed on one or more source receiver traces. Accordingly, in instances in the disclosure where an absolute is used, the disclosure may also be interpreted to be referring to a subset.

The decision to steer a well in a given direction may be dependent on geologic, geophysical, petrophysical and reservoir properties of the formation(s) being traversed. While drilling, information about a well's productivity can complement geosteering decisions and aid in improving a well's trajectory. For example, if the productivity of the well in a given direction is higher, it is possible to steer the well in that direction, or change the trajectory to that direction that will give the improved productivity.

A measure of the ability of the well to produce may be referred to as a productivity index. In an example, the productivity index may be defined by the symbol J as the ratio of the total liquid flow rate to the pressure drawdown. For a water-free oil production, the productivity index in terms of Darcy's law may be given by $$J = \frac{7.08 \times 10^{-3} kh}{\mu_o B_o \left( \ln\left(\frac{r_e}{r_w}\right) - 0.75 + s \right)}$$

where
J=productivity index, STB/day/psi
k=permeability (mD)
h=thickness of the reservoir (ft)
$\mu_o$=viscosity of oil (cp)
$B_o$=Formation volume factor of oil (rb/stb)
$r_e$=radius of the average drainage area (ft)
$r_w$=radius of the wellbore (ft)
s=skin (dimensionless)

Alternatively J may be expressed as:

$$J = \frac{q}{\overline{p} - p_{wf}} (STB/D/psi)$$

where
$\overline{p}$=volumetric average drainage area pressure (static pressure) in psi
$P_{wf}$=bottom-hole flowing pressure in psi
q=flowrate stb/d The equation above, and various forms of fluid flow equations in porous media, show the benefit of having rock and fluid properties in order to estimate production and productivity.

These input parameters however have uncertainty. Exemplary sources of uncertainty include the tools making the measurement, the errors involved in the interpretation of the data, the errors in the computational methods, the uncertainties due to the assumptions made, and uncertainty due to the resolution of the data acquired while drilling. As a result, these uncertainties may propagated into the productivity forecast made while drilling.

Sensitivity analysis and uncertainty analysis may quantify the uncertainty in the input parameters and provide a possible range for which the productivity forecast lies. Sensitivity analysis may describe how the uncertainty in the output of a mathematical model or system (numerical or otherwise) can be apportioned to different sources of uncertainty in its inputs. Uncertainty analysis may investigate the uncertainty of variables that are used in decision-making problems in which observations and models represent a knowledge base. Uncertainty analysis may make a technical contribution to decision-making through the quantification of uncertainties in variables. In numerical experiments and modeling uncertainty analysis may draw upon a number of techniques for determining the reliability of model predictions, accounting for various sources of uncertainty in model input and design.

The computing systems, methods, processing procedures, techniques and workflows disclosed herein are more efficient and/or effective methods for identifying, isolating, transforming, and/or processing various aspects of data that is collected from a subsurface region or other multi-dimensional space while drilling to enhance productivity. The described methods and apparatus provide a new technological solution to the petroleum engineering problems described herein. Embodiments are directed to new and specialized processing apparatus and methods of using the same. While-drilling analysis and geosteering decisions according to the present application implicate a new processing approach (e.g., hardware, special purpose processors, specially programmed general purpose processors) because such analyses are too complex and cannot be done by a person in the time available or at all in the while drilling context. Thus, the apparatus and method of the claims are directed to tangible implementations or solutions to a specific technological problem in the drilling field.

Figure 1A:
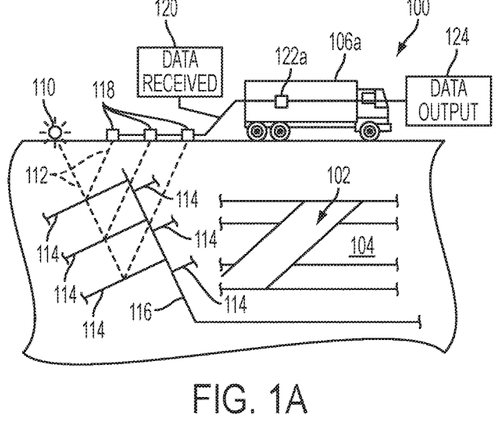
FIG. 1A illustrates a simplified schematic view of a survey operation performed by a survey tool at an oil field.
Figure 1B:
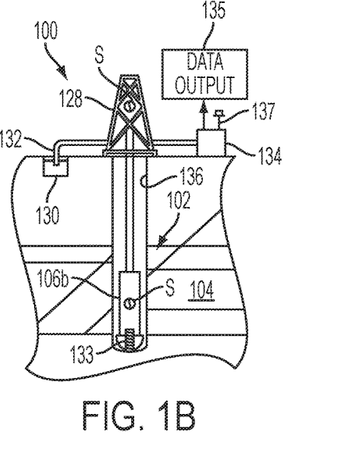
FIG. 1B illustrates a simplified schematic view of a drilling operation performed by drilling tools.
Figure 1C:
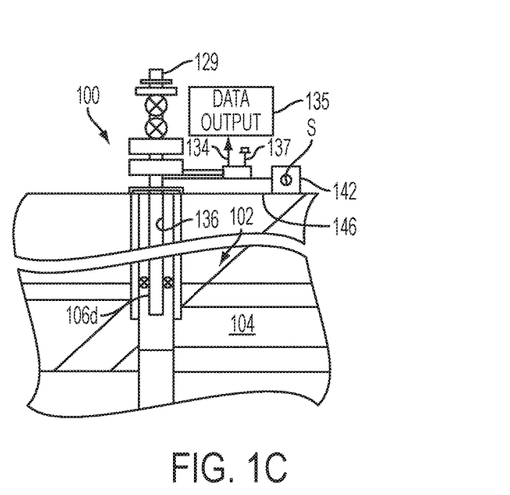
FIG. 1C illustrates a simplified schematic view of a production operation performed by a production tool.

FIGS. 1A-1C illustrate simplified, schematic views of oilfield 100 having subterranean formation 102 containing reservoir 104 therein in accordance with implementations of various technologies and techniques described herein. FIG. 1A illustrates a survey operation being performed by a survey tool, such as seismic truck 106a, to measure properties of the subterranean formation. The survey operation is a seismic survey operation for producing sound vibrations. In FIG. 1A, one such sound vibration, e.g., sound vibration 112 generated by source 110, reflects off horizons 114 in earth formation 116. A set of sound vibrations is received by sensors, such as geophone-receivers 118, situated on the earth's surface. The data received 120 is provided as input data to a computer 122a of the seismic truck 106a, and responsive to the input data, computer 122a generates seismic data output 124. This seismic data output may be stored, transmitted or further processed as desired, for example, by data reduction.

FIG. 1B illustrates a drilling operation being performed by drilling tools 106b suspended by rig 128 and advanced into subterranean formations 102 to form wellbore 136. Mud pit 130 is used to draw drilling mud into the drilling tools via flow line 132 for circulating drilling mud down through the drilling tools, then up wellbore 136 and back to the surface. The drilling mud is filtered and returned to the mud pit. A circulating system may be used for storing, controlling, or filtering the flowing drilling mud. The drilling tools are advanced into subterranean formations 102 to reach reservoir 104. Each well may target one or more reservoirs. The drilling tools are adapted for measuring downhole properties using logging while drilling tools. The logging while drilling tools may also be adapted for taking core sample 133 as shown.

The drilling tool 106b may include downhole sensor S adapted to perform logging while drilling (LWD) data collection. The sensor S may be any type of LWD sensor and includes without limitation sensors adapted to collect fluid data as described in the various embodiments of the present disclosure.

Computer facilities may be positioned at various locations about the oilfield 100 (e.g., the surface unit 134) and/or at remote locations. Surface unit 134 may be used to communicate with the drilling tools and/or offsite operations, as well as with other surface or downhole sensors. Surface unit 134 is capable of communicating with the drilling tools to send commands to the drilling tools, and to receive data therefrom. Surface unit 134 may also collect data generated during the drilling operation and produce data output 135, which may then be stored or transmitted.

Sensors (S), such as gauges, may be positioned about oilfield 100 to collect data relating to various oilfield operations as described previously. As shown, sensor (S) is positioned in one or more locations in the drilling tools and/or at rig 128 to measure drilling parameters, such as weight on bit, torque on bit, pressures, temperatures, flow rates, compositions, rotary speed, and/or other parameters of the field operation. Sensors (S) may also be positioned in one or more locations in the circulating system.

Drilling tools 106b may include a bottom hole assembly (BHA) (not shown), generally referenced, near the drill bit (e.g., within several drill collar lengths from the drill bit). The bottom hole assembly includes capabilities for measuring, processing, and storing information, as well as communicating with surface unit 134. The bottom hole assembly further includes drill collars for performing various other measurement functions.

The bottom hole assembly may include a communication subassembly that communicates with surface unit 134. The communication subassembly is adapted to send signals to and receive signals from the surface using a communications channel such as mud pulse telemetry, electro-magnetic telemetry, or wired drill pipe communications. The communication subassembly may include, for example, a transmitter that generates a signal, such as an acoustic or electromagnetic signal, which is representative of the measured drilling parameters. It will be appreciated by one of skill in the art that a variety of telemetry systems may be employed, such as wired drill pipe, electromagnetic or other known telemetry systems.

The wellbore may be drilled according to a drilling plan that is established prior to drilling. The drilling plan may set forth equipment, pressures, trajectories and/or other parameters that define the drilling process for the wellsite. The drilling operation may then be performed according to the drilling plan. However, as information is gathered, the drilling operation may need to deviate from the drilling plan. Additionally, as drilling or other operations are performed, the subsurface conditions may change. The earth model may also need adjustment as new information is collected.

The data gathered by sensors (S) may be collected by surface unit 134 and/or other data collection sources for analysis or other processing. The data collected by sensors (S) may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

Surface unit 134 may include transceiver 137 to allow communications between surface unit 134 and various portions of the oilfield 100 or other locations. Surface unit 134 may also be provided with or functionally connected to one or more controllers (not shown) for actuating mechanisms at oilfield 100. Surface unit 134 may then send command signals to oilfield 100 in response to data received. Surface unit 134 may receive commands via transceiver 137 or may itself execute commands to the controller. A processor may be provided to analyze the data (locally or remotely), make the decisions and/or actuate the controller. In this manner, oilfield 100 may be selectively adjusted based on the data collected. This technique may be used to optimize portions of the field operation, such as controlling drilling, weight on bit, pump rates, or other parameters. These adjustments may be made automatically based on computer protocol, and/or manually by an operator. In some cases, well plans may be adjusted to select optimum operating conditions, or to avoid problems.

FIG. 1C illustrates a production operation being performed by production tool 106D deployed from a production unit or Christmas tree 129 and into completed wellbore 136 for drawing fluid from the downhole reservoirs into surface facilities 142. The fluid flows from reservoir 104 through perforations in the casing (not shown) and into production tool 106d in wellbore 136 and to surface facilities 142 via gathering network 146.

Sensors (S), such as gauges, may be positioned about oilfield 100 to collect data relating to various field operations as described previously. As shown, the sensor (S) may be positioned in production tool 106d or associated equipment, such as Christmas tree 129, gathering network 146, surface facility 142, and/or the production facility, to measure fluid parameters, such as fluid composition, flow rates, pressures, temperatures, and/or other parameters of the production operation.

Production may also include injection wells for added recovery. One or more gathering facilities may be operatively connected to one or more of the wellsites for selectively collecting downhole fluids from the wellsite(s).

While FIGS. 1B-1C illustrate tools used to measure properties of an oilfield, it will be appreciated that the tools may be used in connection with non-oilfield operations, such as gas fields, mines, aquifers, storage or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors (S) may be located at various positions along the wellbore and/or the monitoring tools to collect and/or monitor the desired data. Other sources of data may also be provided from offsite locations.

The field configurations of FIGS. 1A-1C are intended to provide a brief description of an example of a field usable with oilfield application frameworks. Part, or all, of oilfield 100 may be on land, water, and/or sea. Also, while a single field measured at a single location is depicted, oilfield applications may be utilized with any combination of one or more oilfields, one or more processing facilities and one or more wellsites.

Figure 2:
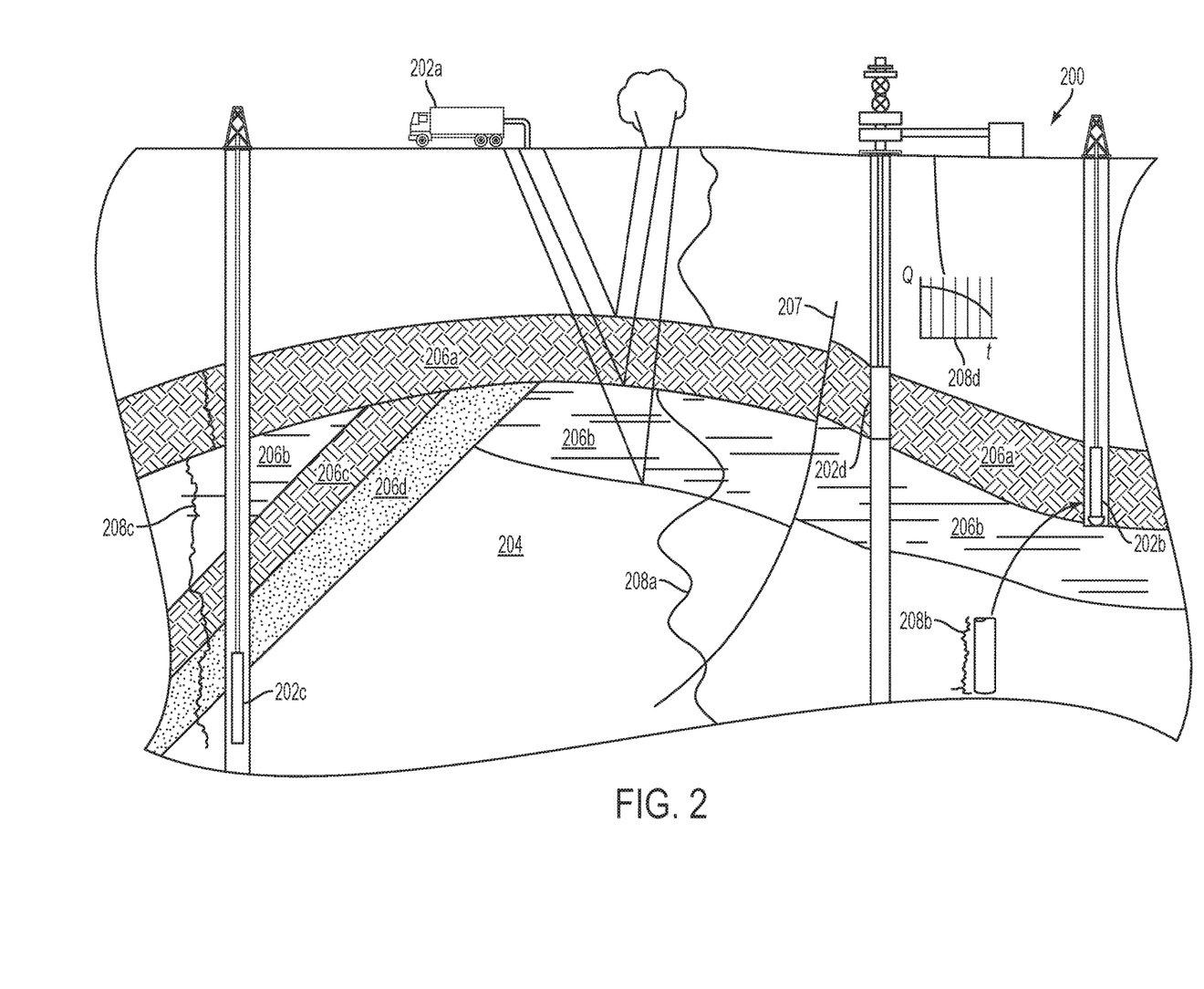
FIG. 2 illustrates a schematic view, partially in cross section, of an oilfield.

FIG. 2 illustrates a schematic view, partially in cross section of oilfield 200 having data acquisition tools 202a, 202b, 202c and 202d positioned at various locations along oilfield 200 for collecting data of subterranean formation 204 in accordance with implementations of various technologies and techniques described herein. Data acquisition tools 202a-202d may be the same as data acquisition tools 106a-106d of FIGS. 1A-1C, respectively, or others not depicted. As shown, data acquisition tools 202a-202d generate data plots or measurements 208a-208d, respectively. These data plots are depicted along oilfield 200 to demonstrate the data generated by the various operations.

Data plots 208a-208c are examples of static data plots that may be generated by data acquisition tools 202a-202c, respectively; however, it should be understood that data plots 208a-208c may also be data plots that are updated in real time. These measurements may be analyzed to better define the properties of the formation(s) and/or determine the accuracy of the measurements and/or for checking for errors. The plots of each of the respective measurements may be aligned and scaled for comparison and verification of the properties.

Static data plot 208a is a seismic two-way response over a period of time. Static plot 208b is core sample data measured from a core sample of the formation 204. The core sample may be used to provide data, such as a graph of the density, porosity, permeability, or some other physical property of the core sample over the length of the core. Tests for density and viscosity may be performed on the fluids in the core at varying pressures and temperatures. Static data plot 208c is a logging trace that provides a resistivity or other measurement of the formation at various depths.

A production decline curve or graph 208d is a dynamic data plot of the fluid flow rate over time. The production decline curve provides the production rate as a function of time. As the fluid flows through the wellbore, measurements are taken of fluid properties, such as flow rates, pressures, composition, etc.

Other data may also be collected, such as historical data, user inputs, economic information, and/or other measurement data and other parameters of interest. As described below, the static and dynamic measurements may be analyzed and used to generate models of the subterranean formation to determine characteristics thereof. Similar measurements may also be used to measure changes in formation aspects over time.

The subterranean structure 204 has a plurality of geological formations 206a-206d. As shown, this structure has several formations or layers, including a shale layer 206a, a carbonate layer 206b, a shale layer 206c and a sand layer 206d. A fault 207 extends through the shale layer 206a and the carbonate layer 206b. The static data acquisition tools are adapted to take measurements and detect characteristics of the formations.

While a specific subterranean formation with specific geological structures is depicted, it will be appreciated that oilfield 200 may contain a variety of geological structures and/or formations, sometimes having extreme complexity. In some locations, for example below the water line, fluid may occupy pore spaces of the formations. Each of the measurement devices may be used to measure properties of the formations and/or its geological features. While each acquisition tool is shown as being in specific locations in oilfield 200, it will be appreciated that one or more types of measurement may be taken at one or more locations across one or more fields or other locations for comparison and/or analysis.

The data collected from various sources, such as the data acquisition tools of FIG. 2, may then be processed and/or evaluated. Seismic data displayed in static data plot 208a from data acquisition tool 202a may be used by a geophysicist to determine characteristics of the subterranean formations and features. The core data shown in static plot 208b and/or log data from well log 208c may be used by a geologist to determine various characteristics of the subterranean formation. The production data from graph 208d may be used by the reservoir engineer to determine fluid flow reservoir characteristics. The data analyzed by the geologist, geophysicist and the reservoir engineer may be analyzed using modeling techniques.

Figure 3:
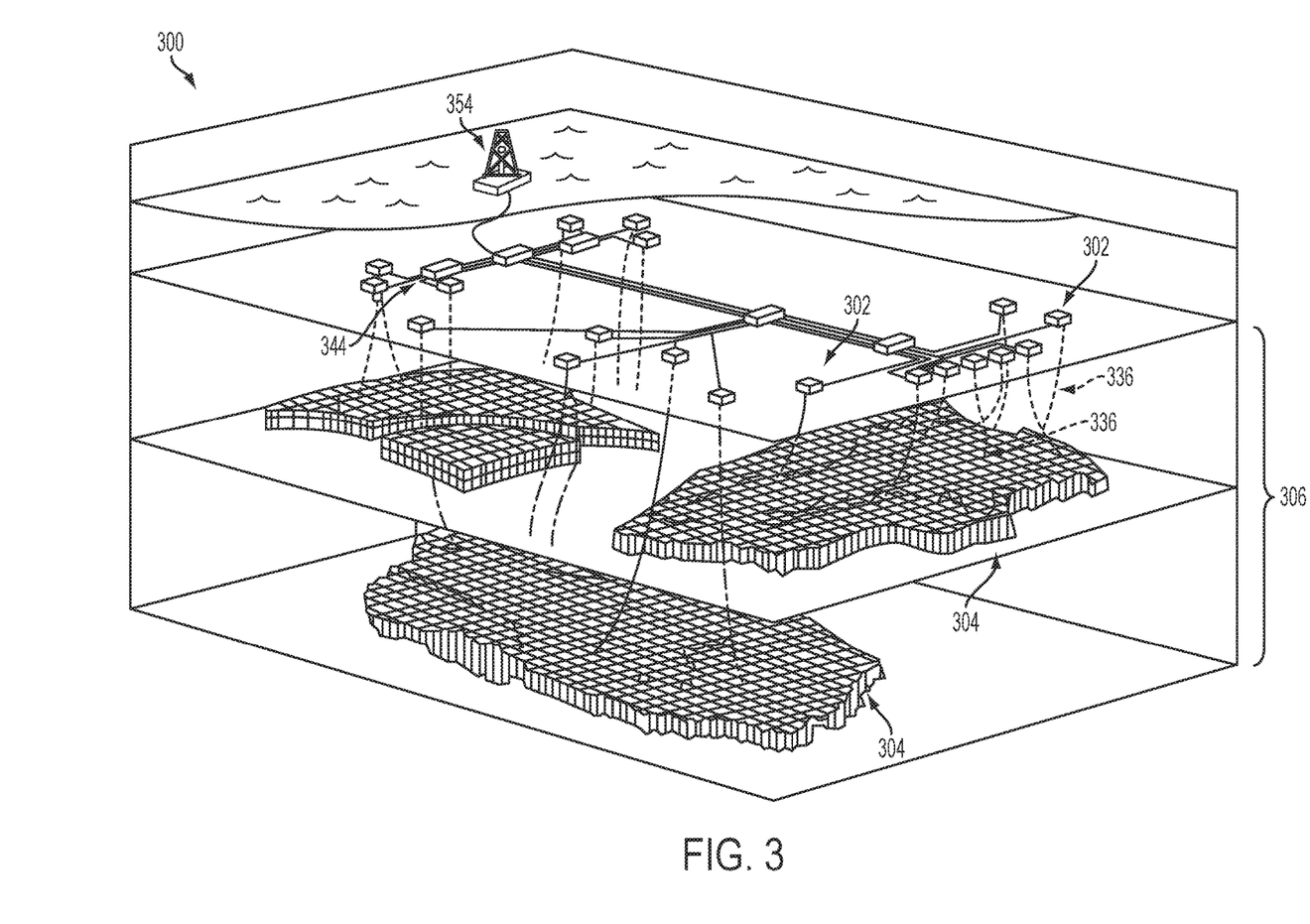
FIG. 3 illustrates a perspective view of an oilfield.

FIG. 3 illustrates an oilfield 300 at which production operations in accordance with implementations of various technologies and techniques described herein may be performed. The oilfield 300 has a plurality of wellsites 302 operatively connected to central processing facility 354. The oilfield configuration of FIG. 3 does not limit the scope of the oilfield application system. The oilfield, or parts thereof, may be on land and/or sea. Also, while a single oilfield with a single processing facility and a plurality of wellsites is depicted, any combination of one or more oilfields, one or more processing facilities and one or more wellsites may be present.

Each wellsite 302 has equipment that forms wellbore 336 into the earth. The wellbores 336 extend through subterranean formations 306 including reservoirs 304. These reservoirs 304 contain fluids, such as hydrocarbons. The wellsites 302 draw fluid from the reservoirs 304 and pass them to the processing facility 354 via surface networks 344. The surface networks 344 have tubing and control mechanisms that control the flow of fluids from the wellsites 302 to the processing facility 354.

Attention is now directed to methods, techniques, and workflows for processing and/or transforming collected data that are in accordance with some embodiments. Some operations in the processing procedures, methods, techniques, and workflows disclosed herein may be combined and/or the order of some operations may be changed. Those with skill in the art will recognize that in the geosciences and/or other multi-dimensional data processing disciplines, various interpretations, sets of assumptions, and/or domain models such as drilling plan models, may be refined in an iterative fashion; this concept is applicable to the procedures, methods, techniques, and workflows as discussed herein. This iterative refinement can include use of feedback loops executed on an algorithmic basis, such as at a computing device (e.g., computing system 2100, FIG. 7), and/or through manual control by a user who may make determinations regarding whether a given action, template, or model has become sufficiently accurate.

Various aspects of the present disclosure relate to including real time fluid data into a workflow to enhance productivity while drilling, while reducing the uncertainty due to fluid measurements. Previously, fluid data could not be reliably obtained or measured while drilling. Thus, fluid data has not been considered in geosteering decisions and/or while drilling processes.

Those with skill in the art will appreciate that while the term "real time" is used to describe some data acquisition and systems control characteristics, the term "real time" may also refer to near real time or pre-determined or maximum response time systems, depending on factors related to the architecture of the systems used for drilling, data collection, and systems control; in this disclosure, the use of "real time" or "real-time" may refer to actual real time system response, near real time system response or systems with pre-determined or maximum response times. In some embodiments, estimations of the uncertainty while drilling associated with the productivity forecasts are created. In varying embodiments, one or more of the following aspects are manifested in particular implementations as discussed below.

In some embodiments, real time fluid measurements include real time identification information and samples that can be used to build a near wellbore reservoir model when acquired. Real time samples may be acquired by a formation sampling while drilling (SWD) tool (see, e.g., as one non-limiting example, U.S. Pat. No. 8,839,858, while those with skill in the art will appreciate that many types of tools may be used for this purpose).

Fluid identification data may be determined from various tools, including without limitation, a formation sampling while drilling tool, advanced mud logging while drilling services, or other fluid data acquired from while drilling measurements. This information can be used to assist in better defining the reservoir fluid model.

Application of Measurements in a Productivity while Drilling Workflow

In some embodiments, the near wellbore reservoir model being built may be done in real time while the well is being drilled. The following are exemplary aspects that may be included in a while drilling workflow.

Modeling capabilities: In some embodiments, a high-speed semi-analytical reservoir simulator or a numerical reservoir simulation may be used to make a productivity forecast, enabling or improving accurate and reliable modeling of the inflow system.

Ability to model the impact of an aquifer on the reservoir model: In some embodiments, by including an aquifer model or the flux of an aquifer model, the productivity forecast while drilling measurement may be more realistic for reservoirs with active aquifers.

Sensitivity Analysis while drilling: In some embodiments, as the productivity while drilling is being estimated, the uncertainty in this measurement may be apportioned to different sources of uncertainty in its inputs when a numerical reservoir simulator is used.

Uncertainty Analysis while drilling: In some embodiments, the uncertainty in the input parameters may be defined by a probability density function (PDF). Using these PDFs, the stochastic effect of the input parameters' uncertainties may be determined for the productivity while drilling estimates.

In various embodiments, productivity while drilling may include a while drilling workflow that combines a static near wellbore geologic and petrophysical model with a reservoir simulator, with the objective of optimizing or improving the productivity from the well and maximizing or increasing the net present value (NPV) of the well while drilling. In one specific embodiment, the input data for this analysis may include those that have been described in U.S. Pat. No. 7,966,166, which is incorporated by reference in its entirety; those with skill in the art will appreciate, however, that the various embodiments described herein are not necessarily constrained to be implemented as set forth in U.S. Pat. No. 7,966,166. In some embodiments, a simulation study is done and provides a base model to compare estimated range of productivities as the well is being drilled. The output from the simulation may be production. In some embodiments disclosed herein, in addition to estimating production, the output may include the productivity index (PI) of the well.

In an example set forth in U.S. Patent App. Pub. No. 2010/0282508, which is incorporated by reference in its entirety, a technique is provided to allow for real-time alteration of the trajectory of the well during drilling of the well. In some embodiments disclosed herein, the use of the optical properties of a formation fluid can be used to identify compartmentalized reservoirs in real time and hence optimize (or improve) the drilling trajectory.

In some embodiments, a single well predictive model (SWPM) may be used to generate a near wellbore reservoir model for performing performance prediction (see, e.g., U.S. Pat. No. 7,725,302, which is incorporated by reference in its entirety).

In some embodiments, sensitivity analysis and uncertainty analysis may be applied to a while drilling scenario to identify and quantify uncertainties in the input and output associated with productivity estimation and forecasting while drilling.

In various embodiments disclosed herein, a fast fluid simulator and a numerical reservoir simulator may be used to predict the pressure—production performance of the well. The Inflow Performance Relationship (IPR) and Productivity Index (PI) of the well may then be computed from the results of the numerical simulator. In some embodiments, in addition to handling the risks associated with uncertainty in the bounding constraints, the uncertainties in the input parameters and how they impact the productivity forecast may also be taken into consideration.

In some embodiments, the problem may be formulated as a multi-objective optimization problem, where drilling of the well is terminated when, in addition to when the NPV cannot be optimized (or improved) further, the change in productivity index with change in length of well drilled is zero (0) or negative.

In some embodiments, numerical solutions for estimating the range of PI and its growth may be used.

Figure 4:
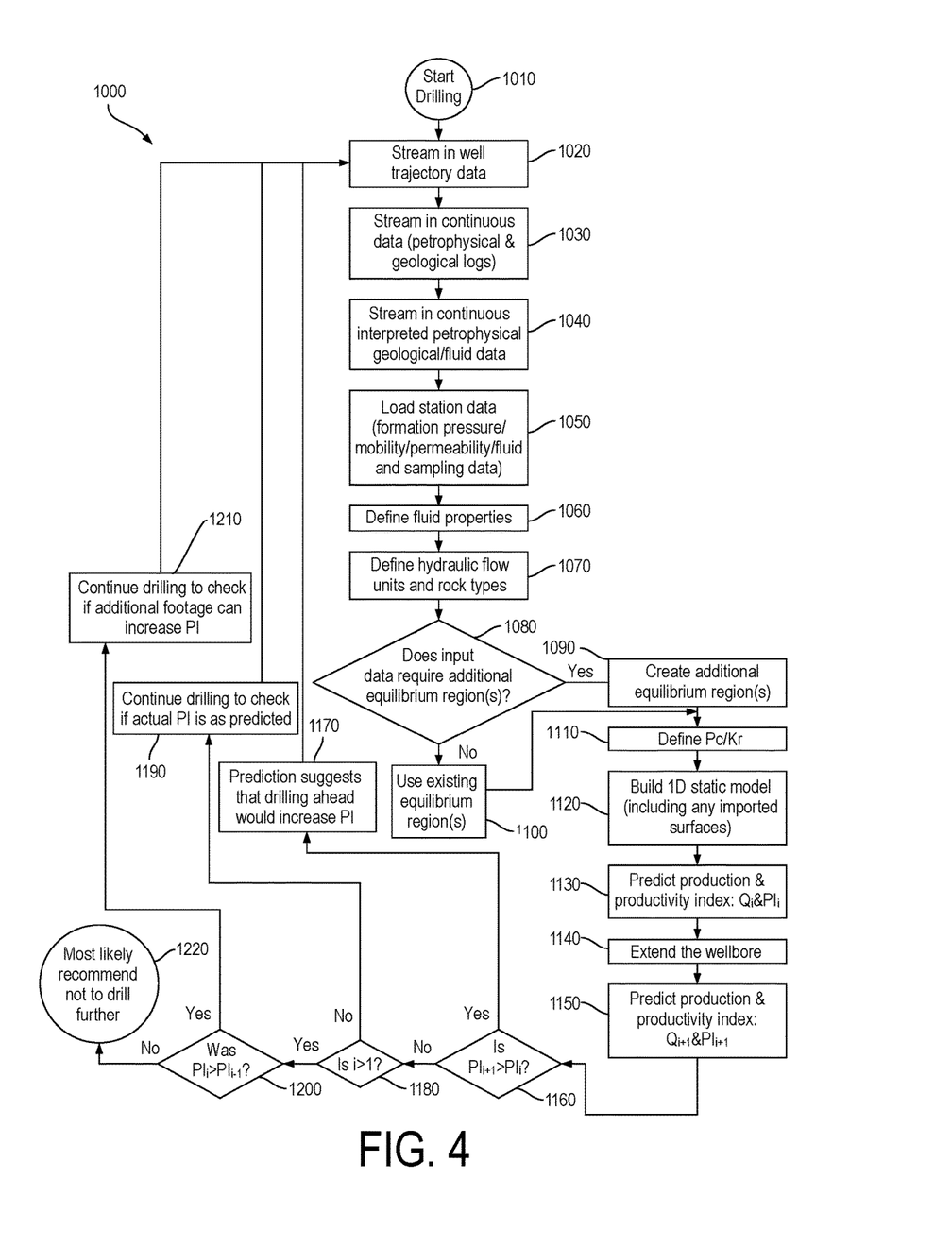
FIG. 4 illustrates an exemplary workflow including real time fluid data measurements in accordance with an embodiment.

Referring to FIG. 4, workflow 1000 may combine real time fluid data measurements with other real time Logging While Drilling (LWD) data to perform production and productivity forecast using a Single Well Predictive Model (SWPM). The real time fluid data can include, but is not limited to, one or more of the following: Gas-Oil ratio (GOR), fluid density (could also be in the form of American Petroleum Institute (API) gravity or specific gravity), fluid viscosity, fluid composition, water-oil fraction, water resistivity, fluorescence and optical density. In varying embodiments, these measurements can be taken at specified pressures, specified temperatures, or both. The fluid(s) could be oil, gas, water, or condensate. The input data may be station measurements (example downhole fluid identification data or downhole sampling data) or analysed at specific depths based on continuous fluid data (example fluid logging and analysis in real time, FLAIR, data from mud logs). As used in this disclosure, fluid data means a property of the fluid itself. As an example, fluid flow is a behaviour of the fluid and not a property of the fluid itself.

At 1010, drilling of the well is started. At 1020, well trajectory data is streamed in. For example, well trajectory data may be transmitted from a sensor S/computing system 2101B to a surface unit/computing system 2101A while drilling is in progress.

At 1030, petrophysical or geologic data or both petrophysical and geologic data is streamed in. In various embodiments, these data may be directly collected in real time from one or more LWD tools. For example, petrophysical or geologic data may be transmitted from a sensor S/computing system 2101B to a surface unit/computing system 2101A while drilling is in progress.

At 1040, interpreted petrophysical/geologic and/or fluid data may be streamed in. These data may be from interpretations done on the LWD data. Examples of such data includes but is not limited to, one or more of the following: saturations, surfaces, dips, permeability, effective porosities, Fluid Logging and Analysis In Real time (FLAIR) data. For example, interpreted petrophysical/geologic and/or fluid data may be transmitted from a computing system 2101B to a surface unit/computing system 2101A.

At 1050, station data may be loaded. Station data may include some or all of the LWD data acquired in a stationary mode, which may include one or more of the following non-limiting examples of LWD data: formation pressures, downhole fluid identification data, and sampling while drilling data. In some embodiments, other data such as capillary pressures, relative permeability data may be loaded at this stage, if available. For example, station data may be transmitted from a computing system 2101B to a surface unit/computing system 2101A. It will be appreciated that the order of steps 1020-1050 is merely exemplary and other orders of streaming data in may also be used.

At 1060, one or more fluid properties may be defined or determined based on the real time fluid data that is being acquired while drilling. At 1070, one or more hydraulic flow units and/or rock types may be defined or determined. In some embodiments, this is performed in an SWPM workflow. At 1080, whether input data requires additional equilibrium region(s) may be determined. Equilibrium regions may include subsurface pockets with different pressures and/or different fluid systems. A well may encounter such pockets along its path. Whether a well sees a new equilibrium region may be determined from LWD data, for example using pressure data and fluid data. In varying embodiments, from a combination of the real time fluid data, petrophysical data and geologic data, it may be determined whether there is compartmentalization or there are different equilibrium regions. If this is the case, one or more additional equilibrium region(s) may be provided at 1090. Otherwise, the existing equilibrium region(s) are used at 1100. In some embodiments, a determination of how the numerical reservoir model will be initialized in real time is made, either algorithmically or through intervention. In some embodiments, initial reservoir conditions may be set as follows:

A first method assumes the reservoir is in hydrostatic equilibrium and hence is initialized by equilibration A second method is a form of non-equilibrium initialization where the initial conditions can be set explicitly that may be referred to as enumeration. In this case, the initial reservoir conditions to start the study may be defined from a point in existing production or known pressure and saturation information.

At 1110, the capillary pressures (Pc) and relative permeabilities (Kr) associated with the rock types may be defined or established. At 1120, a 1D static model may be built. Note that 2D and 3D models may also be used. This may be based on the petrophysical, geologic and reservoir data (raw and interpreted) that is acquired in real time. A supporting aquifer model may be built at this stage depending on the reservoir architecture and drive mechanism. The aquifer model could be analytical or numerical.

At 1130, Production ($Q_i$) and Productivity Index ($PI_i$) may be predicted. As an example, production $Q_i$ may be calculated using a simulator based on a reservoir initial pressure $p_i$ and a specified well pressure $pw_f$ where $PI_i=Q_i/(p_i-pw_f)$. This is the production and productivity estimate based on the drilled section extended according to a current trajectory.

Figure 6:
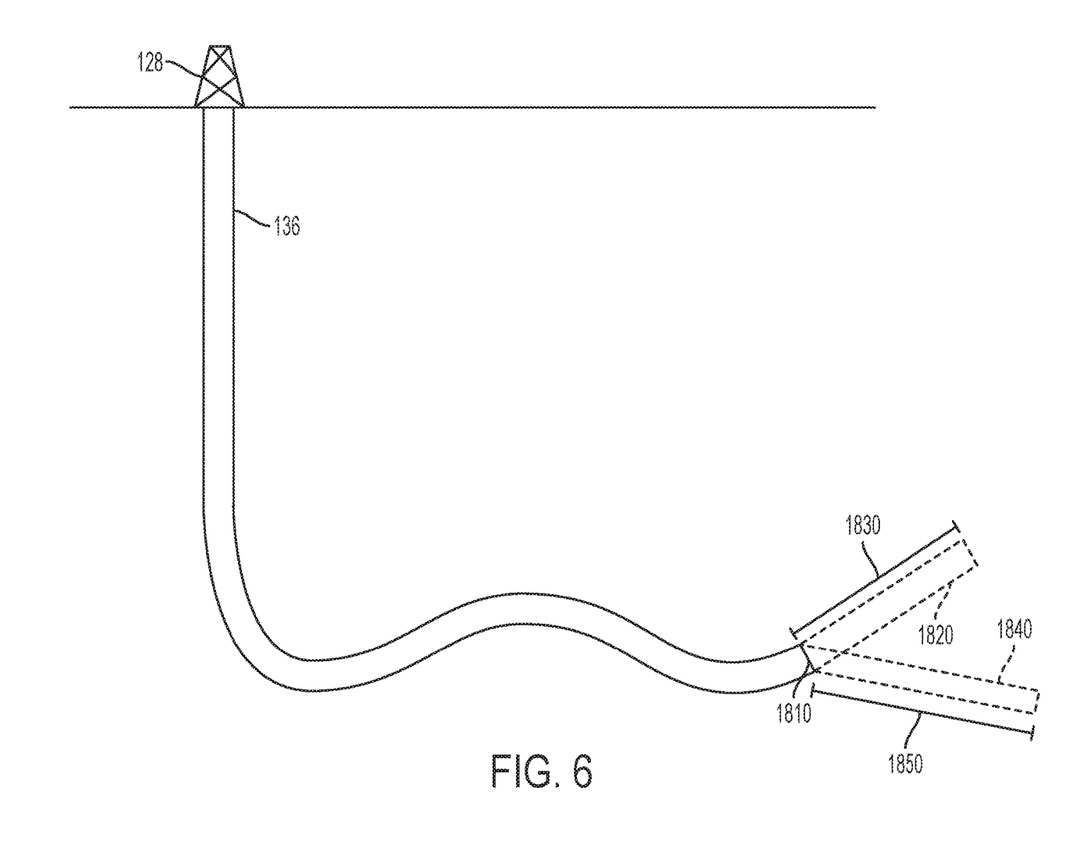
FIG. 6 illustrates an exemplary cross-sectional view of an oil field in accordance with an embodiment.

At 1140, the wellbore is extended in the simulation. At this stage, a future projection of the wellbore trajectory may made. In some cases, several scenarios of the future projection of the wellbore trajectory may be made. With reference to FIG. 6, a horizontal wellbore 136 may be drilled to a current distance 1810. As a first extended section, a section 1820 may be extended a distance 1830 according to the current trajectory of the wellbore. A first productivity estimate (as discussed further below) may be determined based on simulation for the extended section 1820. As a second extended section, a section 1840 may be extended a distance 1850 according to a trajectory different than the current trajectory of the wellbore. A second productivity estimate (as discussed further below) may be determined based on simulation for the extended section 1840. The distance 1850 and the distance 1830 may be the same.

At 1150, Production ($Q_{i+1}$) and Productivity Index ($PI_{i+1}$) may be predicted. The index i+1 indicates that this Production and Productivity Index corresponds to a well bore position one iteration beyond that of the index i. The estimated production and productivity may relate to one or more new wellbore trajectory (ies) ahead of a current position of the wellbore drilling activity.

At 1160, a comparison may made between the Productivity Index of the projected trajectory(ies) ($PI_{i+1}$) (e.g., section 1840 of FIG. 6) with the Productivity Index of the current drilled well trajectory ($PI_i$) (e.g., section 1820 of FIG. 6). If the Productivity Index of the projected trajectory (ies) is greater than the Productivity Index of the existing drilled well trajectory, it implies that drilling ahead in a selected projected trajectory(ies) will give better productivity, and hence it is recommended to continue drilling ahead at 1170. If the Productivity Index of the projected trajectory (ies) is less than the Productivity Index of the current drilled well trajectory, then a further analysis may be based on if this is the first iteration or if this has been the case more than once at 1180. It will be appreciated that a direct comparison (e.g., greater than or less than) may be made between the forecasted productivity indices. Alternatively, a minimum threshold difference (e.g., that the difference between one productivity index and a second productivity index exceeds a threshold amount) may be used before adjusting the drilling trajectory. If the productivity index of the projected trajectory (e.g., section 1840 of FIG. 6) is improved compared to that of continuing the current trajectory (e.g., section 1820 of FIG. 6), then the drilling trajectory may be adjusted towards that of the direction of the projected trajectory (e.g., section 1840 of FIG. 6).

At 1190, drilling is continued to check if the actual Productivity Index is as predicted. For example, the drilling tools 106b may extend the wellbore 136 in a proscribed direction. If an iteration was the first iteration when $PI_{i+1}$ was found to be less than Ph, then the well may still be drilled ahead to check if new formations or rock and fluid properties will be encountered to improve productivity.

At 1200, if this iteration was not in the first iteration when $PI_{i+1}$ was found to be less than $PI_i$, then a check may be made to confirm if $PI_i$ (the PI of the currently drilled trajectory) is greater than the previous PI prior to the footage drilled. If $PI_i>Pi_{i-1}$ then it may imply that additional footage drilled yielded some increase in productivity, and thus it may be worthwhile to drill further at 1210. If $PI_i \leq Pi_{i-1}$, then it may be recommended not to drill further, as further drilling has not increased the productivity at 1220.

As those with skill in the art will appreciate, the real time data can be used to compute the productivity (PI) while drilling. The uncertainty due to assumptions on fluid properties are reduced, as the fluid data is from the well being drilled not offset well data. The PI computed from real time data compared with PI predicted by extending the wellbore in real time provides a basis for determining how the well can be steered towards productivity. It also provides a basis for determining if the well should be drilled further.

Uncertainty and Sensitivity Analysis while Drilling

Turning to sensitivity analysis and probabilistic forecasting in a while drilling scenario, in some embodiments, application of productivity estimates while drilling may be made to a) test the robustness of the results of a model or system in the presence of uncertainty; b) determine relationships between input parameters and the productivity estimate; c) identify input parameters that cause significant uncertainty in the productivity estimates and can therefore be the focus of attention if the accuracy of the productivity estimates have to be improved upon; and/or d) find regions in the space of the input parameters for which the productivity estimate is optimized (or improved).

Sensitivity analysis may be performed for one or more parameters involved in the productivity forecast while drilling. For example, sensitivity analysis may be included as part of the predication performed at 1130. A base case of productivity estimate while drilling may be made. Then these parameters may be sensitized using a one-at-a-time method or a variance based sensitivity analysis.

Figure 5:
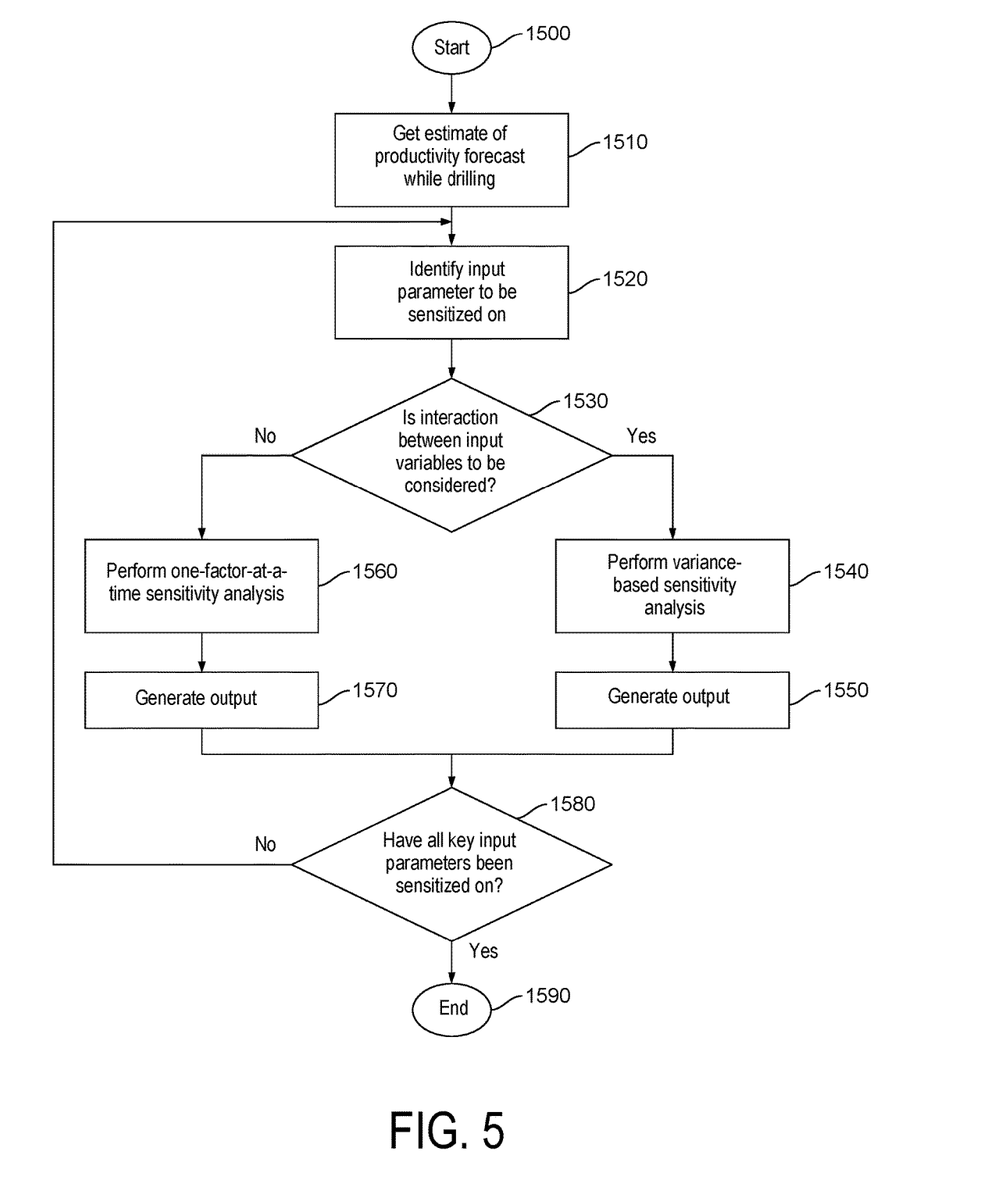
FIG. 5 illustrates an exemplary workflow including a sensitivity analysis in accordance with an embodiment.

FIG. 5 illustrates an exemplary sensitivity analysis while drilling workflow 1500. In some embodiments, the output from the sensitivity analysis may be deterministic. In further embodiments, the output may be presented in a tornado plot.

In some embodiments, sensitivity analysis on parameters to optimize (or improve) LWD plans may include, but are not limited to, one or more of: absolute permeability, relative permeability, anisotropy, porosity, skin, solution GOR, bubble point pressure, wellbore diameter, water saturation, irreducible water saturation, reservoir thickness, radius of investigation, rock type, fluid viscosity, aquifer model and aquifer strength. The LWD plan may include but is not limited to formation pressure-while-drilling, sonic-while-drilling, imaging-while-drilling, magnetic resonance-while-drilling, array resistivity, seismic-while-drilling, bed boundary detection, and reservoir-mapping-while-drilling services.

Those with skill in the art will appreciate that once the sensitivity analysis is completed, decisions may be made to acquire additional data if it can help to reduce the uncertainty.

A base estimate of a productivity forecast while drilling is determined at 1510. This may be determined as described above with respect to 1130. At 1510, one or more input parameters are selected to be sensitized. This may be determined by input of a user or by rules programmed into a computing system (e.g., a certain order or other criteria for selecting input parameters). At 1530, it is determined whether interaction between input variables is to be considered. For example, if input parameters are correlated, then they interaction may be considered and the variables may be sensitized together.

If the interaction between input parameters is to be considered, then the variance based sensitive analysis is performed at 1540 and output is generated at 1550. Exemplary output may include a tornado chart showing which parameter has the biggest impact on well productivity, or an uncertainty range on well productivity. If the interaction between input parameters is not to be considered, then the one factor at a time sensitivity analysis is performed at 1560 and output is generated at 1570. Exemplary output may include a tornado chart showing which parameter has the biggest impact on well productivity, or an uncertainty range on well productivity.

Probabilistic Forecasting while Drilling

For the input parameters which have been identified (e.g., absolute permeability, relative permeability, anisotropy, porosity, skin, solution GOR, bubble point pressure, wellbore diameter, water saturation, irreducible water saturation, reservoir thickness, radius of investigation, rock type, fluid viscosity, aquifer model and aquifer strength), probability density functions (PDFs) may be used to define or determine parameters prior to uncertainty analysis. An example of defining or determining parameters includes defining or estimating a distribution of uncertain parameters based on existing data from a drilled section of the same well or other wells in the same or a different field. Porosity, for example, may be between 0.1 and 0.2, with a normal distribution and/or permeability may be between 1 and 100, following a log-normal distribution. In some embodiments, one or more simulation runs based on statistical sampling methods may then be conducted for the productivity estimate model (using the input parameters with their PDFs) to generate a probabilistic output of the productivity estimate.

In some embodiments, probabilistic forecasting while drilling may be done in parallel to sensitivity analysis; in other embodiments, probabilistic forecasting while drilling may be performed after sensitivity analysis is completed.

In some embodiments, this methodology may be applied on both a fast fluid flow simulator and a numerical simulator. In other embodiments, this methodology is applied on either a fast fluid flow simulator or a numerical simulator.

In some embodiments, probabilistic forecasting while drilling with statistical methods may be used to quantify uncertainty on well productivity.

Those with skill in the art will appreciate that, in various embodiments, drilling may be guided by quantified well productivity in light of uncertainty analysis, in addition to production and NPV considerations.

In some embodiments, as noted above, workflows may integrate real time fluid measurements into the analysis. The real time fluid data measurements, may include, but are not limited to, one or more of: Gas-Oil ratio (GOR), fluid density (could also be in the form of API gravity or specific gravity), fluid viscosity, fluid composition, water-oil fraction, water resistivity, fluorescence and optical density. These measurements can be taken at specified pressures or temperatures, or both. The fluid(s) could be oil, gas, water, or condensate. The input data could be station measurements (example downhole fluid identification data or downhole sampling data) or analysed at specific depths based on continuous fluid data (example fluid logging and analysis in real time, FLAIR, data from mud logs).

By way of example, if current information cannot determine if drilling is headed into an oil-zone or a water-zone, then the productivity index may have a large uncertainty index. As such an example, consider a seismic survey that has a 50' resolution. A rock indicated 100' thick may actually be in the range of 50-150' thick. For comparison, the uncertainty may be 50% in view of the large range of possible values for input parameters. If a sensor installed that can provide more information about the rock being drilled (e.g., reduce the resolution to 5'), then that uncertainty can be reduced. To determine if it is worthwhile to install that sensor, that input value can be sensitized by simulating the productivity index with a determined value for that parameter, such as could happen with the sensor installed. For example, the uncertainty may be reduced to 10%. A determination can then be made as to whether it is beneficial (e.g., cost effective) to install the sensor and obtain the information to improve the reliability of the productivity index.

Computing Systems

Figure 7:
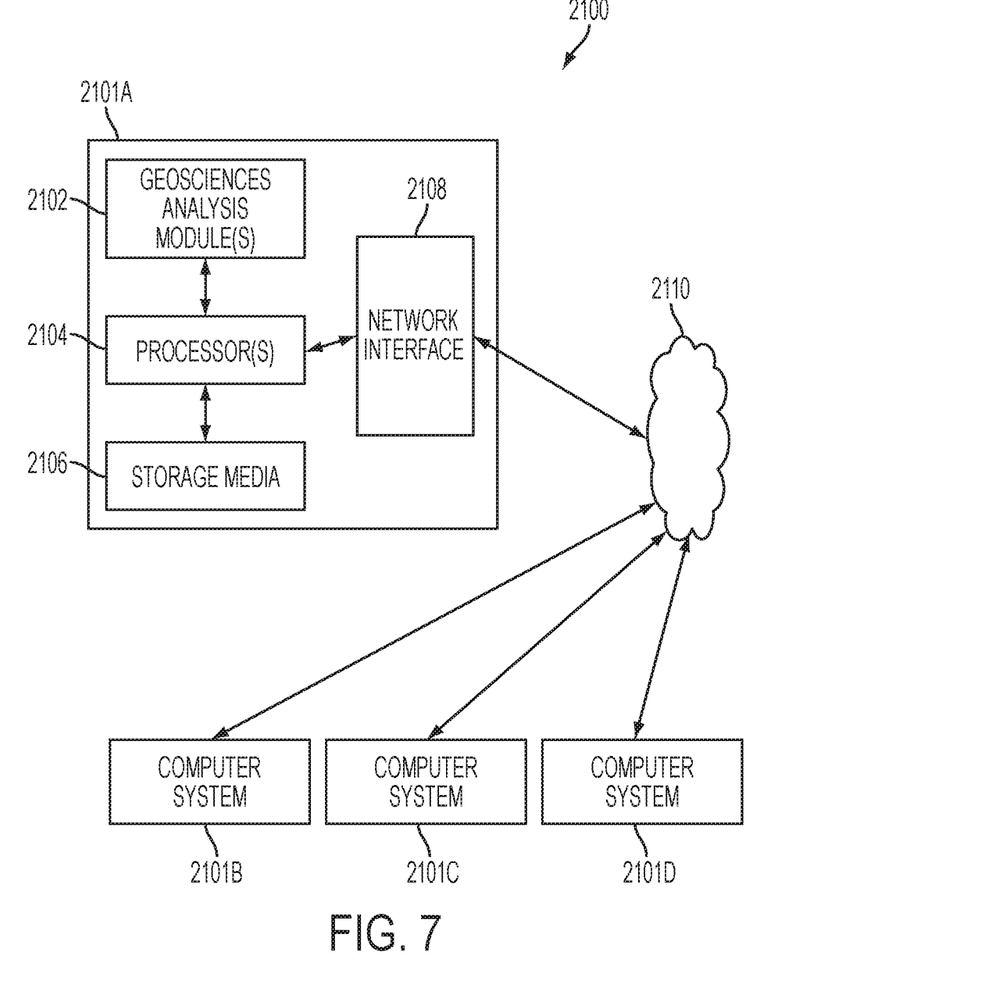
FIG. 7 illustrates an exemplary computing system in accordance with an embodiment.

FIG. 7 depicts an example computing system 2100 in accordance with some embodiments. The computing system 2100 can be an individual computer system 2101A or an arrangement of distributed computer systems. The computer system 2101A includes one or more geosciences analysis modules 2102 that are configured to perform various tasks according to some embodiments, such as one or more methods disclosed herein. To perform these various tasks, geosciences analysis module 2102 executes independently, or in coordination with, one or more processors 2104, which is (or are) connected to one or more storage media 2106A. The processor(s) 2104 is (or are) also connected to a network interface 108 to allow the computer system 2101A to communicate over a data network 2110 with one or more additional computer systems and/or computing systems, such as 2101B, 2101C, and/or 2101D (note that computer systems 2101B, 2101C and/or 2101D may or may not share the same architecture as computer system 2101A, and may be located in different physical locations, e.g., computer systems 2101A and 2101B may be on a ship underway on the ocean, while in communication with one or more computer systems such as 2101C and/or 2101D that are located in one or more data centers on shore, other ships, and/or located in varying countries on different continents). Note that data network 1110 may be a private network, it may use portions of public networks, it may include remote storage and/or applications processing capabilities (e.g., cloud computing).

A processor can include a microprocessor, microcontroller, processor module or subsystem, programmable integrated circuit, programmable gate array, or another control or computing device.

The storage media 1106A can be implemented as one or more computer-readable or machine-readable storage media. Note that while in the example embodiment of FIG. 7 storage media 2106A is depicted as within computer system 2101A, in some embodiments, storage media 2106A may be distributed within and/or across multiple internal and/or external enclosures of computing system 2101A and/or additional computing systems. Storage media 2106A may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs), BluRays or any other type of optical media; or other types of storage devices. "Non-transitory" computer readable medium refers to the medium itself (i.e., tangible, not a signal) and not data storage persistency (e.g., RAM vs. ROM).

Note that the instructions discussed above can be provided on one computer-readable or machine-readable storage medium, or alternatively, can be provided on multiple computer-readable or machine-readable storage media distributed in a large system having possibly plural nodes and/or non-transitory storage means. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

It should be appreciated that computer system 2101A is one example of a computing system, and that computer system 2101A may have more or fewer components than shown, may combine additional components not depicted in the example embodiment of FIG. 7, and/or computer system 2101A may have a different configuration or arrangement of the components depicted in FIG. 7. The various components shown in FIG. 7 may be implemented in hardware, software, or a combination of both, hardware and software, including one or more signal processing and/or application specific integrated circuits.

It should also be appreciated that while no user input/output peripherals are illustrated with respect to computer systems 2101A, 2101B, 2101C, and 2101D, many embodiments of computing system 2100 include computing systems with keyboards, mice, touch screens, displays, etc. Some computing systems in use in computing system 2100 may be desktop workstations, laptops, tablet computers, smartphones, server computers, etc.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are included within the scope of protection of the disclosure.

Of course, many processing techniques for collected data, including one or more of the techniques and methods disclosed herein, may also be used successfully with collected data types other than seismic data. While certain implementations have been disclosed in the context of seismic data collection and processing, those with skill in the art will recognize that one or more of the methods, techniques, and computing systems disclosed herein can be applied in many fields and contexts where data involving structures arrayed in a multi-dimensional space and/or subsurface region of interest may be collected and processed, e.g., medical imaging techniques such as tomography, ultrasound, MRI and the like for human tissue; radar, sonar, and LIDAR imaging techniques; mining area surveying and monitoring, oceanographic surveying and monitoring, and other appropriate multi-dimensional imaging problems.

Examples of equations and mathematical expressions have been provided in this disclosure. But those with skill in the art will appreciate that variations of these expressions and equations, alternative forms of these expressions and equations, and related expressions and equations that can be derived from the example equations and expressions provided herein may also be successfully used to perform the methods, techniques, and workflows related to the embodiments disclosed herein.

In some embodiments, one disclosed method includes: receiving collected fluid data in real time from a fluid data collection tool used in a drilling operation that includes a first well trajectory; receiving collected logging while drilling data in real time from a LWD tool used in the drilling operation; determining a first productivity metric for the drilling operation, wherein the first productivity metric is based at least in part on the collected fluid data, the collected logging while drilling data, and the first well trajectory; extending the first well trajectory to determine a second well trajectory; determining a second productivity metric for the drilling operation, wherein the second productivity metric is based at least in part on the collected fluid data, the collected logging while drilling data, and the second well trajectory; comparing the first and second productivity metrics; and adjusting the drilling operation in real time to use the second well trajectory when the second productivity metric is larger than the first productivity metric.

In some embodiments, a computing system is provided that comprises at least one processor, at least one memory, and one or more programs stored in the at least one memory, wherein the programs comprise instructions, which when executed by the at least one processor, are configured to perform any method disclosed herein.

In some embodiments, a computer readable storage medium is provided, which has stored therein one or more programs, the one or more programs comprising instructions, which when executed by a processor, cause the processor to perform any method disclosed herein.

In some embodiments, a computing system is provided that comprises at least one processor, at least one memory, and one or more programs stored in the at least one memory; and means for performing any method disclosed herein.

In some embodiments, an information processing apparatus for use in a computing system is provided, and that includes means for performing any method disclosed herein.

These systems, methods, processing procedures, techniques, and workflows increase effectiveness and efficiency. Such systems, methods, processing procedures, techniques, and workflows may complement or replace conventional methods for identifying, isolating, transforming, and/or processing various aspects of data that is collected from a subsurface region or other multi-dimensional space while drilling to enhance productivity.

An exemplary benefit of some of the methods and computing systems of the present disclosure is that more effective and accurate methods for identifying, isolating, transforming, and/or processing various aspects of measured data or other data that is collected during drilling to enhance productivity may be employed.

While any discussion of or citation to related art in this disclosure may or may not include some prior art references, applicant neither concedes nor acquiesces to the position that any given reference is prior art or analogous prior art.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to explain the principles of the invention and its practical applications, to thereby enable others skilled in the art to utilize the invention and various embodiments with various modifications as are suited to the particular use contemplated.

What is claimed is:

1. A method, comprising:
    receiving fluid data collected while drilling a wellbore in a drilling operation that includes a first well section trajectory;
    determining, based at least in part on the fluid data, a first productivity metric for a next section of the wellbore on a continued trajectory of the first well section trajectory;
    determining a second well section trajectory for the next section of the wellbore different from the continued trajectory of the first well section trajectory;
    determining a second productivity metric for the second well section trajectory;
    adjusting the drilling operation of the wellbore if the first productivity metric differs from the second productivity metric by more than a threshold amount;
    determining if a current iteration is a first iteration in which the first productivity metric exceeds the second productivity metric, wherein
        if the current iteration is the first iteration, the adjusting the drilling operation includes determining to extend the wellbore, and
        if the current iteration is not the first iteration, the adjusting includes determining to stop the drilling operation.

2. The method of claim 1, wherein the receiving fluid data includes receiving collected logging while drilling (LWD) data in real time from a LWD tool used in the drilling operation.

3. The method of claim 1, wherein the first productivity metric is a first productivity index and wherein the second productivity metric is a second productivity index.

4. The method of claim 1, wherein the collected fluid data includes one or more fluid data types selected from the group consisting of gas-oil ratio, fluid density, API gravity, specific gravity, fluid viscosity, fluid composition, water-oil fraction, water resistivity, fluorescence and optical density.

5. The method of claim 1, further comprising performing uncertainty analysis while drilling.

6. The method of claim 5, wherein the uncertainty analysis performed while drilling includes sensitivity analysis while drilling.

7. The method of claim 5, wherein the uncertainty analysis performed while drilling includes probabilistic forecasting while drilling.

8. The method of claim 5, wherein the uncertainty analysis performed while drilling includes:
    determining a base productivity estimate using a productivity forecast while drilling the wellbore;
    identifying at least one parameter of the productivity forecast;
    performing sensitivity analysis for the identified at least one parameter;
    determining whether additional data for the at least one parameter would reduce uncertainty; and
    obtaining, if the determining indicates that additional data will reduce uncertainty, additional data for the at least one parameter while drilling the wellbore.

9. The method of claim 1, further comprising determining whether the second productivity metric exceeds the first productivity metric, wherein if the second productivity metric exceeds the first productivity metric, the adjusting the drilling operation includes determining to steer the drilling operation toward the second well section trajectory.

10. The method of claim 1, further comprising:
    determining a base productivity estimate using a productivity forecast while drilling the wellbore, the base productivity metric including a function of liquid flow rate and pressure drawdown;
    identifying at least one parameter of the productivity forecast;
    performing sensitivity analysis for the identified at least one parameter;
    determining whether additional data for the at least one parameter would reduce uncertainty; and
    obtaining, if the determining indicates that additional data will reduce uncertainty, additional data for the at least one parameter while drilling the wellbore.

11. The method of claim 10, wherein the performing the sensitivity analysis includes performing one-factor-at-a-time sensitivity analysis.

12. The method of claim 10, wherein the at least one parameter includes at least two correlated parameters, and the performing the sensitivity analysis includes performing variance-based sensitivity analysis of the at least two correlated parameters.

13. A computing system comprising at least one processor, at least one memory, and one or more programs stored in the at least one memory, wherein the programs comprise instructions, which when executed by the at least one processor, are configured to:
receive fluid data collected while drilling a wellbore in a drilling operation that includes a first well section trajectory;
determine, based at least in part on the fluid data, a first productivity metric for a next section of the wellbore on a continued trajectory of the first well section trajectory;
determine a second well section trajectory for the next section of the wellbore different from the continued trajectory of the first well section trajectory;
determine a second productivity metric for the second well section trajectory;
adjust the drilling operation of the wellbore if the first productivity metric differs from the second productivity metric by more than a threshold amount;
determine if a current iteration is a first iteration in which the first productivity metric exceeds the second productivity metric, wherein if the current iteration is the first iteration, the adjustment to the drilling operation includes a determination to extend the wellbore, and if the current iteration is not the first iteration, the adjustment includes a determination to stop the drilling operation.

14. The computing system of claim 13, wherein the first productivity metric is a first productivity index and wherein the second productivity metric is a second productivity index.

15. A non-transitory computer readable storage medium, which has stored therein one or more programs, the one or more programs comprising instructions, which when executed by a processor, cause the processor to:
receive fluid data collected while drilling a wellbore in a drilling operation that includes a first well section trajectory;
determine, based at least in part on the fluid data, a first productivity metric for a next section of the wellbore on a continued trajectory of the first well section trajectory;
determine a second well section trajectory for the next section of the wellbore different from the continued trajectory of the first well section trajectory;
determine a second productivity metric for the second well section trajectory;
adjust the drilling operation of the wellbore if the first productivity metric differs from the second productivity metric by more than a threshold amount;
determine if a current iteration is a first iteration in which the first productivity metric exceeds the second productivity metric, wherein if the current iteration is the first iteration, the adjustment to the drilling operation includes a determination to extend the wellbore, and if the current iteration is not the first iteration, the adjustment includes a determination to stop the drilling operation.

16. The non-transitory computer readable storage medium of claim 15, wherein the first productivity metric is a first productivity index and wherein the second productivity metric is a second productivity index.

17. A surface unit for processing oilfield data, comprising:
a receiver configured to receive logging while drilling (LWD) data collected in real time from a LWD tool used in a drilling operation of a wellbore at a first well section trajectory of the wellbore, the LWD data including fluid data; and
a processor configured to:
determine, based at least in part on the fluid data, a first productivity metric for a next section of the wellbore on a continued trajectory of the first well section trajectory;
determine a second well section trajectory for the next section of the wellbore different from the continued trajectory of the first well section trajectory;
determine a second productivity metric for the second well section trajectory;
adjust the drilling operation of the wellbore if the first productivity metric differs from the second productivity metric by more than a threshold amount;
determine if a current iteration is a first iteration in which the first productivity metric exceeds the second productivity metric, wherein if the current iteration is the first iteration, the adjustment to the drilling operation includes a determination to extend the wellbore, and if the current iteration is not the first iteration, the adjustment includes a determination to stop the drilling operation.

18. The surface unit of claim 17, wherein the first productivity metric is a first productivity index and wherein the second productivity metric is a second productivity index.

* * * * *